June 22, 1965
TAKAYOSHI KONDŌ
3,190,578
SPINNING REEL
Filed Jan. 29, 1962
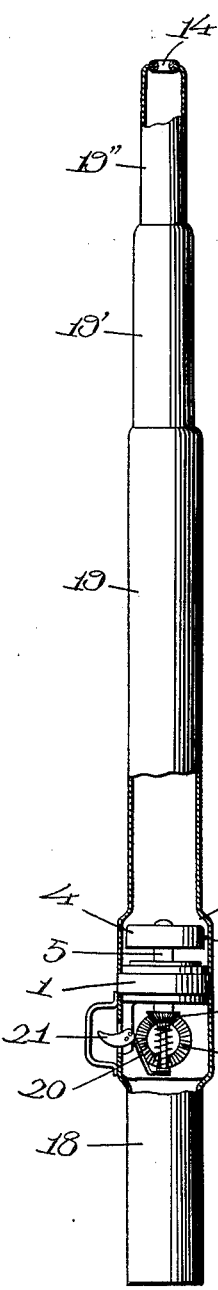
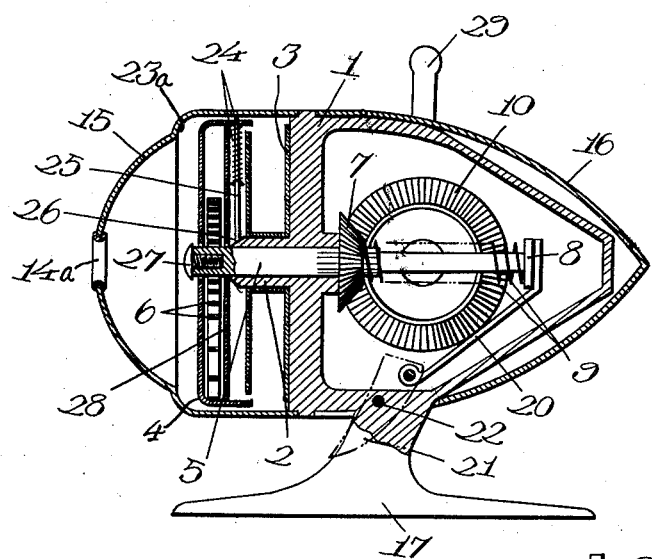
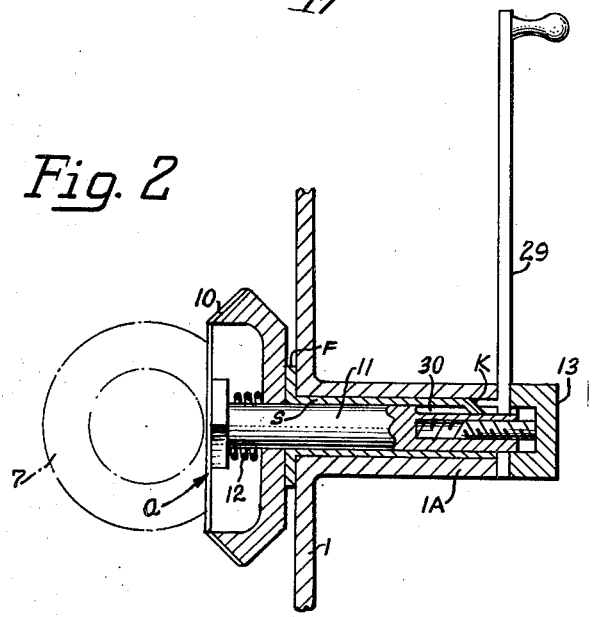
INVENTOR.
TAKAYOSHI KONDŌ
ATTORNEY United States Patent Office 3,190,578
Patented June 22, 1965

3,190,578
SPINNING REEL
Takayoshi Kondō, Tokyo, Japan, assignor to
Takeo Arizono, Tokyo, Japan
Filed Jan. 29, 1962, Ser. No. 169,293
4 Claims. (Cl. 242—84.2)

The present invention is related to a fishing reel.

The object of the present invention is to supply a fishing reel characterized in that the fishing line is automatically drawn out of a reel or drawn in to the reel responsive to the pulling force of a fish, whereby the slack of the line is so adjusted as that the fish will never escape from the hook.

Another object of this invention is to supply a fishing reel in which the elasticity of a fishing rod will not be necessary. By replacing the delicate elasticity of the fishing rod with a mechanically flexible force the rod can be made rigid.

In the consideration of said objects and other objects as will be stated hereinafter, the arrangement and construction of each part of the fishing reel will be described in the specification and the claim thereof hereinbelow.

In the drawings showing an example according to the present invention, FIG. 1 is a side longitudinal section of a fishing reel, FIG. 2, a front longitudinal section of the handle mechanism thereof, and FIG. 3, a side view of the reel applied to a freely extendible fishing rod, shown partly in section.

Describing an example according to the present invention with reference to the drawings, a bearing 2 is installed in the center of a frame 1 and a spool 3 for winding the fishing line is fitted on said bearing 2 and in front of said spool 3 a rotary drum 4 is mounted on a rotary shaft 5 inserted freely slidably into said bearing 2. The outer and inner ends of spring 6 are connected with drum 4 and shaft 5, respectively, so that the spring forms a yielding impositive connection between them. Shaft 5 is formed with a portion of larger diameter, that is, the position at the left, as viewed upon FIG. 1, and a second portion of reduced diameter at the right. Thus a circular shoulder is formed between these portions. That end of the portion of larger diameter, adjacent the aforesaid shoulder, is splined to receive a correspondingly splined bevel pinion 7. Thereby the shaft and pinion are connected for rotation as a unit, while shaft 5 can slide or translate axially through and with respect to the pinion.

The right end of shaft 5 carries an integral head 8 and a spiral spring 9 surrounding the shaft acts between the head and pinion to urge the shaft into its limiting position to the right as viewed upon FIG. 1 and to hold pinion 7 against the abutting surface of frame 1. A bevel gear 10 engaging the small bevel gear 7 is mounted on a handle shaft 11 extending through a bearing 1A integral with frame 1 and a braking and clutching mechanism a (FIG. 2) is constituted between said hand shaft 11 and said bevel gear 10. The braking and clutching mechanism forms no part of the invention.

Said brake and clutch mechanism a comprises a sleeve S having formed integral therewith a flange F. The sleeve is of a length equal to its bearing in 1A, is rotatably mounted in the bearing, and is provided with a key portion K which extends into recess 30 of a shaft 11 carried in the sleeve to provide a slidable but non-rotatable connection therebetween. A flange "f" is formed integral with one end of the shaft and the opposite end of the shaft is threaded to receive an adjustment knob 13.

Further, in the case shown in FIG. 1 a cylinder 15 with an opening as a fishing line hole 14a is fitted on the front of the frame 1, and on the rear thereof a cover 16 is fitted to form a spinning type of reel so as to be mountable on a desired fishing rod by a supporting leg 17 of the frame 1, and in the case shown in FIG. 3, the frame 1 is installed tightly inside a cylindrical holder 18. An extendible rod 19, 19' . . . of multistep form is so constructed as to allow the fishing line to pass therethrough and is fitted to the front frame 1, and in either case a trigger 21 with a connecting rod 20 to push the rotary shaft 5 forward is installed so that the rotary shaft 5 is protruded by pulling said trigger 21 and the fishing line is enabled to be held in between by having the front edge of the rotary drum 4 contacted at a step 23 formed in the extendible rod 19 or step 23a of the cylinder 15. In the case shown in FIG. 3 the trigger 21 is installed like a gun trigger in the cylindrical holder.

Drum 4 carries a stop rod 25 for rotation as a unit therewith. The rod is disposed radially of the drum and shaft 5 and is slidable radially, that is, in the direction of its length, through a limited distance. A coil spring 24 surrounds the shaft and engages at its outer end, the inner surface of the rim of the drum and at its inner end, an abutment fixed with the rod. Thus the rod is continuously and yieldingly urged inwardly. In its radially outermost position the outer end of the rod extends beyond the periphery of drum 4.

In the positions of the parts shown in FIG. 1, the radially inward end of rod 25 engages a conventional cam surface formed on the end of projection 2 of frame 1. The positions and relations of the parts are such that when the inner end of rod 25 rides upon the highest or radially outermost part of the surface, its other end is projected beyond the periphery of drum 4. This is the position of course, wherein trigger 21 is not pulled and shaft 5 has the axial position shown. On the other hand, when trigger 21 is pulled to its mid position, its lever part or rod 20 is pivoted counterclockwise, shaft 5 is translated to the left against the thrust of spring 9, and the drum assembly including drum 4, springs 6 and 24, and rod 25, are moved to the left, as a unit with the shaft. This movement causes the radially inward end of rod 25 to ride down the slope of the cam surface on part 2 and, as a result, spring 24 urges rod 25 radially inwardly so that its outer end is at the periphery of drum 4. In this position drum 4 is freely rotatable and may be used for casting in the normal way. When trigger 21 is pulled to the limit, drum 4 is translated to the left so that it effectively clamps the line between its rounded periphery and a complementary circular shoulder 23a formed by the casing part 15. The action is controllable so that the degree of restraint upon the line may be varied from zero to maximum.

A screw 27 threaded into an aperture in the outer end of shaft 5, prevents displacement of drum 4 from the shaft. Plate 28 fits within the drum and protects spring 6. A handle 29 has a non-circular aperture at its end which receives the correspondingly shaped outer end of shaft 11 so that the shaft is constrained to rotate as a unit with the handle, but may have limited axial translation with respect thereto. An adjustment knob 13, FIG. 2, has an integral threaded shank extending axially therefrom. This shank engages a correspondingly threaded aperture in the end of shaft 11. Thus, turning of the knob effects a corresponding axial translation of shaft 11 in and with respect to its bearing in frame 1, and thus varies the tension in clutch spring 12 and the force with which bevel gear 10 is pressed into frictional contact with flange F. (See FIG. 2.)

In operation, when the fishing line wound on the spool 3 is to be cast, trigger 21 is pulled and shaft 5 is thereby moved forwardly. The radially inner end of rod 25 is moved off cam 26 on the bearing 2 so as to move the top of the stop rod 25 level with the periphery of the rotary sleeve. The fishing line is then cast forwardly. The fishing line wound on the spool 3 is cast forward to a desired distance without encountering any resistance. When the trigger is released, spring 9 moves drum 4 to the right as seen in FIG. 1 and the inner end of rod 25 is caused to ride up on cam surface 26 to project the outer end of the rod beyond the surface of the drum in position to contact the line, and the drawing of the fishing line out of the spool is stopped.

Now, consider a case when the fishing line has thus been cast to a desired place and a fish is caught thereby. The fish acts strongly to try to escape therefrom by its inherent habit and the line wound on the spool 3 is pulled suddenly to be drawn out of the spoon, but at the moment the fishing line, being in contact with the stop rod 25, rotates the rotary drum 4 in the opposite direction, the spiral spring 6 is wound, the tension resisting force of the spiral spring 6 is increased. Hence, without rotating the handle 29, a tensile force is given to the fishing line by the spiral spring 6 responsive to the pulling force of the fish, whereby the fishing line is maintained in tension, and when the fish weakens its pulling force or approaches near the fisher, the tensile force stored in the spiral spring works automatically to wind the fishing line on the spool 3, without slacking the line and prevents the escape of the fish due to the slacking of the fishing line.

However, when the fish caught is so big and the pulling force thereof is greater than the limit of force of the spiral spring 6 which is thus unable to respond to the pulling force of the fish, such a pulling force is transmitted to the rotary shaft 5 and works to rotate it and in consequence the bevel gear 10 through the small bevel gear 7 is rotated.

As the handle shaft 11 is connected to the bevel gear 10 through the brake and clutch mechanism $a$, the friction force between the handle shaft 11 and the bevel gear 10 being controlled by the tensile force of the spring 12, such a friction force works additionally to the tension resisting force of the spiral springs 6, hence by adjusting suitably the adjuster 13 the friction force of the brake and clutch mechanism $a$ is adjusted to respond to the pulling force of a big fish.

Consequently, when the pulling force of a fish overcomes the tension resisting force of the spiral spring and the friction force of the brake and clutch mechanism $a$, the fishing line is conducted out of the spool 3, by rotating the rotary shaft 5, but when the pulling force of the fish weakens, the brake and clutch mechanism $a$ works to prevent the conducting out farther of the fishing line.

Therefore, regardless of the size of a fish, the fishing line is maintained in a state of constant tension, and the escape of the fish and the breaking off of the line are prevented in the fishing tackle according to the present invention.

Since the present invention is such that the tension force responsive to the pulling force of a fish is transmitted to the fishing line through a spring, the delicate elasticity of a fish rod is not only unnecessary, but also a comparatively stiff and large and long metallic rod is usable with this invention without any disadvantage, and as shown in FIG. 3, such a long fishing rod can be supplied as a fishing tackle convenient to carry and simple to handle by constructing the rod as a telescopic extendible tube, and in addition the fishing tackle according to this invention enables bigger catch of fish without the kink and experience of the so-called fishing technique by both of the effectivenesses of the spiral spring and the brake and clutch mechanism thereof and has a material advantage dispersing the trouble of examining and selecting a fish rod.

In example according to the present invention has been described hereinabove, but this invention is not at all limited to the example given above, and it is apparent that this invention includes all of the constructions in the scope of the items of the claim annexed hereto.

I claim:

1. In a fishing reel, a frame including a transverse wall and a cylindrical boss integral with and extending from one surface of said wall centrally thereof, there being a bearing bore through said wall and boss centrally thereof, a shaft journalled in said bore for rotation and for axial translation from a first to a second position, the forward end of said shaft projecting forwardly of said boss, a spool mounted on said boss, a winding drum journalled on the projecting forward end of said shaft in parallel proximity with said spool, a spiral spring fixedly connected to said shaft and drum, means connected with said shaft to manually rotate the same, means carried by the drum responsive to axial translation of said drum to move from a first position beyond the surface of the drum to a second position coextensive with said surface.

2. The reel of claim 1, said last-named means including a rod carried by and radially disposed with respect to said drum for radial translation between the first radially outward position to the second position, spring means urging said rod toward its said second position, and a cam surface on said boss engageable with the radially inward end of said rod and operable thereon to move said rod to first position, by and in response to translation of said shaft to its said first position.

3. The reel of claim 2, second spring means urging said shaft into its said first position, and manually-operable trigger means pivoted to said frame and engageable with said shaft to axially translate the same to second position against the urge of said second spring means.

4. In a casting reel, a frame having a longitudinal axis, and including a wall normal to said axis and an integral boss extending therefrom forwardly along said axis, there being a bearing bore through said wall and boss, coaxial of said axis, the forward end of said boss having a cam surface, a shaft journaled in said bore for rotation and for axial translation between a first rearward position and a second forward position, a spool mounted on said boss coaxial of said axis, a drum journaled on the free forward end of said shaft and including a peripheral skirt extending rearwardly adjacent said spool, a spiral spring in said drum and fixedly connected at its ends with said shaft and said drum, respectively, a rod carried by said drum radially of said axis, for rotation as a unit therewith and for translation radially thereof between first and second positions wherein the radially-outward end of said rod projects beyond the drum surface and is coextensive with said surface, respectively, means urging said rod to second position, the inner end of said rod engaging said cam surface only when said shaft is in its said first position, to thereby translate said rod to its said first position beyond the surface of the drum.

References Cited by the Examiner

UNITED STATES PATENTS

| 1,738,204 | 12/29 | Qualman | 43—20 |
| 2,276,524 | 3/42 | Taylor | 43—20 X |
| 2,402,882 | 6/46 | Garr | 43—20 |
| 2,613,468 | 10/52 | Hand | 43—20 |
| 2,711,292 | 6/55 | Taggart et al. | 242—84.51 X |
| 2,736,979 | 3/56 | Le Gal | 242—84.2 X |
| 2,752,717 | 7/56 | Lind | 43—20 |
| 2,828,088 | 3/58 | Denison et al. | 242—84.2 |
| 2,834,559 | 5/58 | Nagy | 242—84.21 |
| 2,957,264 | 10/60 | Ruff | 43—20 |
| 3,000,586 | 9/61 | Mandolf | 242—84.2 |
| 3,020,665 | 2/62 | Hull | 43—20 |
| 3,062,474 | 11/62 | Clark | 242—84.2 |
| 3,099,412 | 7/63 | Nystrom | 242—82 X |

MERVIN STEIN, *Primary Examiner.*

ABRAHAM G. STONE, *Examiner.*